(12) United States Patent
Kim et al.

(10) Patent No.: US 11,995,357 B2
(45) Date of Patent: May 28, 2024

(54) DISAGGREGATION COMPUTING SYSTEM AND METHOD

(71) Applicant: ELECTRONICS AND TELECOMMUNICATIONS RESEARCH INSTITUTE, Daejeon (KR)

(72) Inventors: Dae Ub Kim, Daejeon (KR); Jong Tae Song, Daejeon (KR); Joon Ki Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 40 days.

(21) Appl. No.: 17/940,502

(22) Filed: Sep. 8, 2022

(65) Prior Publication Data
US 2023/0229360 A1 Jul. 20, 2023

(30) Foreign Application Priority Data
Jan. 17, 2022 (KR) .................. 10-2022-0006805

(51) Int. Cl.
*G06F 3/06* (2006.01)
*G06F 12/02* (2006.01)
*G06F 13/16* (2006.01)

(52) U.S. Cl.
CPC ............ *G06F 3/067* (2013.01); *G06F 3/0607* (2013.01); *G06F 3/0653* (2013.01); *G06F 12/0292* (2013.01); *G06F 13/1668* (2013.01); *G06F 2212/1016* (2013.01)

(58) Field of Classification Search
CPC ...... G06F 3/067; G06F 3/0607; G06F 3/0653; G06F 12/0292; G06F 13/1668; G06F 2212/1016; G06F 3/0631; G06F 3/0658; G06F 3/0662; G06F 2009/45579
See application file for complete search history.

(56) References Cited

U.S. PATENT DOCUMENTS

| | | | |
|---|---|---|---|
| 6,065,046 A | 5/2000 | Feinberg et al. | |
| 8,943,294 B2 | 1/2015 | Cha et al. | |
| 9,575,889 B2 * | 2/2017 | Chang ................ | G06F 12/0284 |
| 10,572,150 B2 * | 2/2020 | Li ......................... | G06F 3/0635 |
| 10,789,090 B2 | 9/2020 | Koh et al. | |

(Continued)

FOREIGN PATENT DOCUMENTS

| KR | 10-2001-0022458 A | 3/2001 |
|---|---|---|
| KR | 10-2019-0042465 A | 4/2019 |

(Continued)

*Primary Examiner* — Sean D Rossiter
(74) *Attorney, Agent, or Firm* — NSIP Law (57) ABSTRACT

Disclosed herein a disaggregation computing system. The disaggregation computing system comprising: a local computing device that comprises a local processor, a local memory bus, a local memory and a local disaggregation controller; a remote computing device that comprises a remote processor, a remote memory bus, a remote memory and a remote disaggregation controller; and a disaggregation network that connects the local computing device and the remote computing device, wherein the local disaggregation controller and the remote disaggregation controller are configured to: check a response delay for access of the remote memory, and control the access of the remote memory based on the response delay.

13 Claims, 10 Drawing Sheets

(56) References Cited

U.S. PATENT DOCUMENTS

| | | | |
|---|---|---|---|
| 2007/0288675 A1 | 12/2007 | Matsuyama | |
| 2009/0070775 A1* | 3/2009 | Riley | H04L 49/35 |
| | | | 719/321 |
| 2019/0303027 A1* | 10/2019 | Lee | G06F 3/061 |
| 2019/0324811 A1* | 10/2019 | Ganguli | G06F 9/505 |
| 2021/0089220 A1* | 3/2021 | Gkoulalas-Divanis | |
| | | | G06F 21/6245 |
| 2021/0117334 A1* | 4/2021 | Guim Bernat | G06F 12/0835 |
| 2022/0012139 A1* | 1/2022 | Nowatzyk | G06F 11/1451 |
| 2022/0342835 A1* | 10/2022 | Kim | G06F 3/067 |
| 2022/0365688 A1* | 11/2022 | Perry | G06F 3/0683 |
| 2023/0205445 A1* | 6/2023 | Nair | G06F 11/1092 |
| | | | 711/154 |

FOREIGN PATENT DOCUMENTS

| | | |
|---|---|---|
| KR | 10-2019-0113040 A | 10/2019 |
| KR | 10-2021-0002331 A | 1/2021 |

* cited by examiner

DISAGGREGATION COMPUTING SYSTEM AND METHOD

CROSS REFERENCE TO RELATED APPLICATION

The present application claims priority to a Korean patent application 10-2022-0006805, filed Jan. 17, 2022, the entire contents of which are incorporated herein for all purposes by this reference.

BACKGROUND OF THE INVENTION

Field of the Invention

The present disclosure relates to cloud computing and a heterogeneous computing technology, and more particularly, to a technology for a processing unit or processor accessing and managing a memory in a remote site.

Description of the Related Art

With the advances of networking technology, cloud systems for sharing computing resources are being provided. A cloud system may be configured to let various physical infrastructures be shared by many users, and a physical infrastructure may include one or more computing systems equipped with various types of processors, an accelerator, a memory, storage and a network.

A physical infrastructure should be used to implement or execute a workload required in an application program. However, as the physical infrastructure should be shared within a cloud system, the cloud system manages the physical infrastructure for implementing or executing the workload required by the application program through a logic server or a virtual machine (VM).

Furthermore, due to the drastic increase of data intensive workloads like in-memory database, data caching, bioinformatics and graph processing, the memory capacity required by a cloud system is increasing, and the number of tasks, in which heterogeneous processors and accelerators share a memory, are on the rise.

To catch up with such a trend, a large-capacity type cloud system with a single virtual machine (VM) and a 1 TB or larger memory available is being provided.

SUMMARY

A technical object of the present disclosure is to provide a method and apparatus for sharing data by recognizing each memory which are attached to heterogeneous computing devices connected via a network to each other and for memory disaggregation of remote memories.

Another technical object of the present disclosure is to provide a memory disaggregation method and apparatus for memories of various computing devices, which are clustered through connection via a network, especially, through long-range connection via an optical network.

Anther technical object of the present disclosure is to provide a method and apparatus for adaptively controlling access to a memory for a response delay of a computing resource with memory disaggregation.

Another technical object of the present disclosure is to provide a method and apparatus for managing a delay of a computing resource with memory disaggregation and for efficiently managing an access address.

The technical objects of the present disclosure are not limited to the above-mentioned technical objects, and other technical objects that are not mentioned will be clearly understood by those skilled in the art through the following descriptions.

According to an embodiment of the present disclosure, there is provided a disaggregation computing system. The disaggregation computing system comprising: a local computing device that comprises a local processor, a local memory bus, a local memory and a local disaggregation controller; a remote computing device that comprises a remote processor, a remote memory bus, a remote memory and a remote disaggregation controller; and a disaggregation network that connects the local computing device and the remote computing device, wherein the local disaggregation controller and the remote disaggregation controller are configured to: check a response delay for access of the remote memory, and control the access of the remote memory based on the response delay.

The features briefly summarized above for this disclosure are only exemplary aspects of the detailed description of the disclosure which follow, and are not intended to limit the scope of the disclosure.

According to the present disclosure, a memory disaggregation method and apparatus may be provided for memories of computing devices that are clustered through connection via a network, especially, through long-range connection via an optical network.

According to the present disclosure, a method and apparatus for adaptively controlling access to a memory for a response delay of a computing resource with memory disaggregation may be provided.

According to the present disclosure, a method and apparatus for managing a delay of a computing resource with memory disaggregation and for efficiently managing an access address may be provided.

According to the present disclosure, a method and apparatus for overcoming a physical positional limitation in using a remote disaggregated memory and for controlling access to the memory may be provided.

According to the present disclosure, it is possible to provide a method and apparatus for realizing an interface of remote disaggregation, which is capable of expanding a processing capacity and securing performance in a processing unit, an accelerator and a processor and for managing a network delay of a disaggregated memory of a program that is used by directly accessing a remote disaggregated memory.

According to the present disclosure, a method and apparatus for managing a disaggregated memory may be provided to enable a program operation and cooperation to be efficiently performed with no limitation on the scale of a remote computing resource.

Effects obtained in the present disclosure are not limited to the above-mentioned effects, and other effects not mentioned above may be clearly understood by those skilled in the art from the following description.

DETAILED DESCRIPTION OF THE INVENTION

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

Hereinafter, embodiments of the present disclosure will be described with reference to the accompanying drawings.

Figure 1:
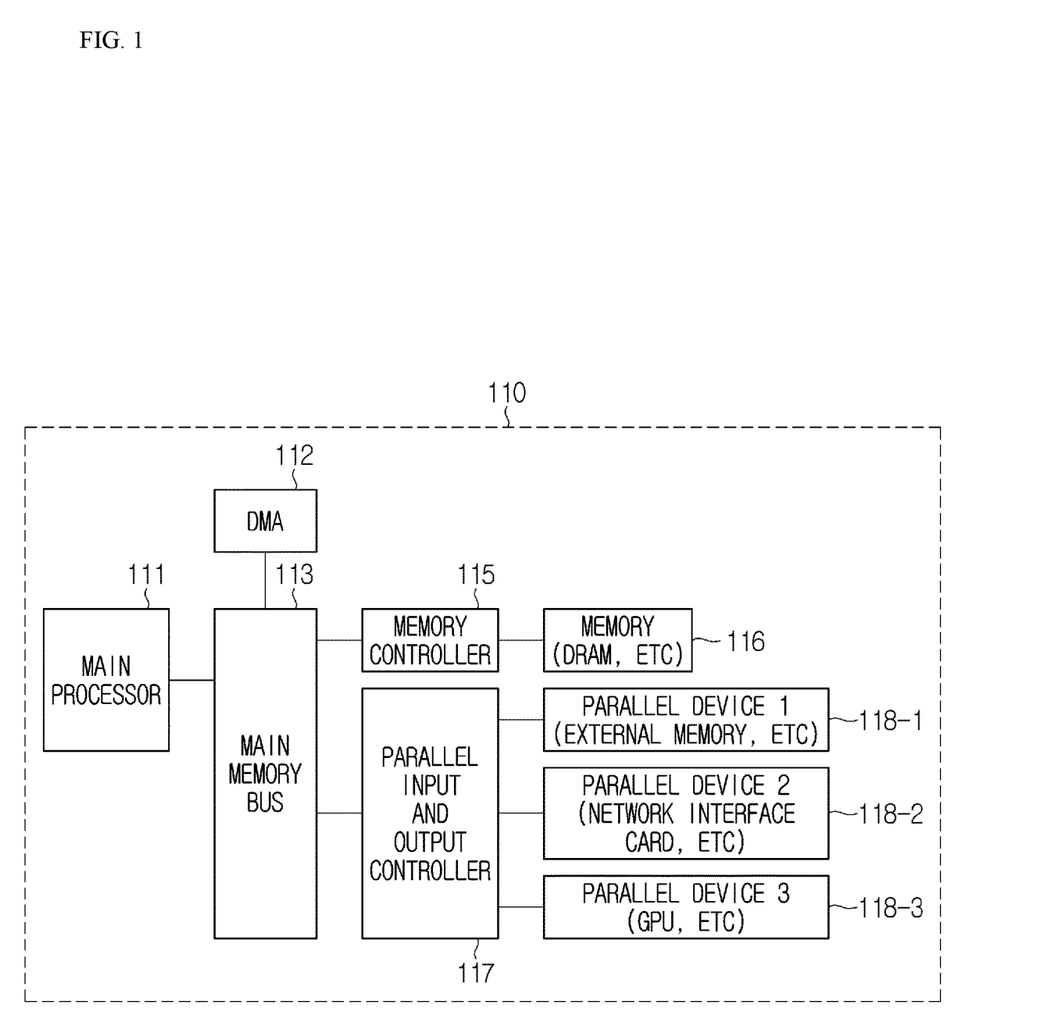
FIG. 1 is a block diagram illustrating a conventional computing system.

FIG. 1 is a block diagram illustrating a conventional computing system.

Referring to FIG. 1, a computing system 110 may include a main processor 111 like a central processing unit (CPU).

A data processing unit like the main processor 111 uses internal and external memories of a chip in a process of processing and calculating data, when an operating system (OS) and application software of a computing system are driven. In order to use a memory 116 like a DRAM, the main processor 111 may access the memory 116 through a bus 113, which is connected to the main processor 111, and a memory controller 115.

In addition, since a storage 118-1, a network interface card (NIC) 118-2, and a graphic card (graphic processor unit: GPU) 118-3, which are classified as peripheral devices, do not have a fast response, the main processor 111 does not directly access the peripheral devices 118-1, 118-2 and 118-3 but transmits and receives data of a cache or a memory to and from the peripheral devices 118-1, 118-2 and 118-3 by utilizing a PCIe technology and a direct memory access (DMA) controller, which makes the data read and writhe response waiting status of the main processor 111 occur less frequently and thus prevents performance degradation.

For data processing and calculation for services like artificial intelligence (AI) and machine learning (ML) in a basic computing system, the GPU 118-3, which a graphic card, is utilized and takes part in computing, along with the main processor 111. However, a peripheral 10 interface and a protocol, which are applied for connecting the peripheral devices 118-1, 118-2 and 118-3, are used to share data between the main processor 111 and the GPU 118-3, and in a representative example, each peripheral device is accessed through PCIe which is transformed again into an interface suitable for data processing of the specific peripheral devices 118-1, 118-2 and 118-3. In comparison with the broadband bus (byte address bus) 113 that is used for data reading and writing of the processor 111 and the memory 116, PCIe has a low bandwidth and a low response speed, and connection through PCIe causes a data bottleneck and a response delay due to an additional time of connecting a peripheral device and a memory through the DMA controller and the addition of a data processing time of the peripheral devices 118-1, 118-2 and 118-3. Thus, the overall performance of data processing and calculation is degraded.

Furthermore, as GPUs related to big data processing, artificial intelligence (AI) and machine learning (ML) are used in a greater scale and the computing data processing and calculation are increasing their scale, there is a demand for and an attempt to utilize a lot of heterogeneous computing resources that are connected together.

Figure 2:
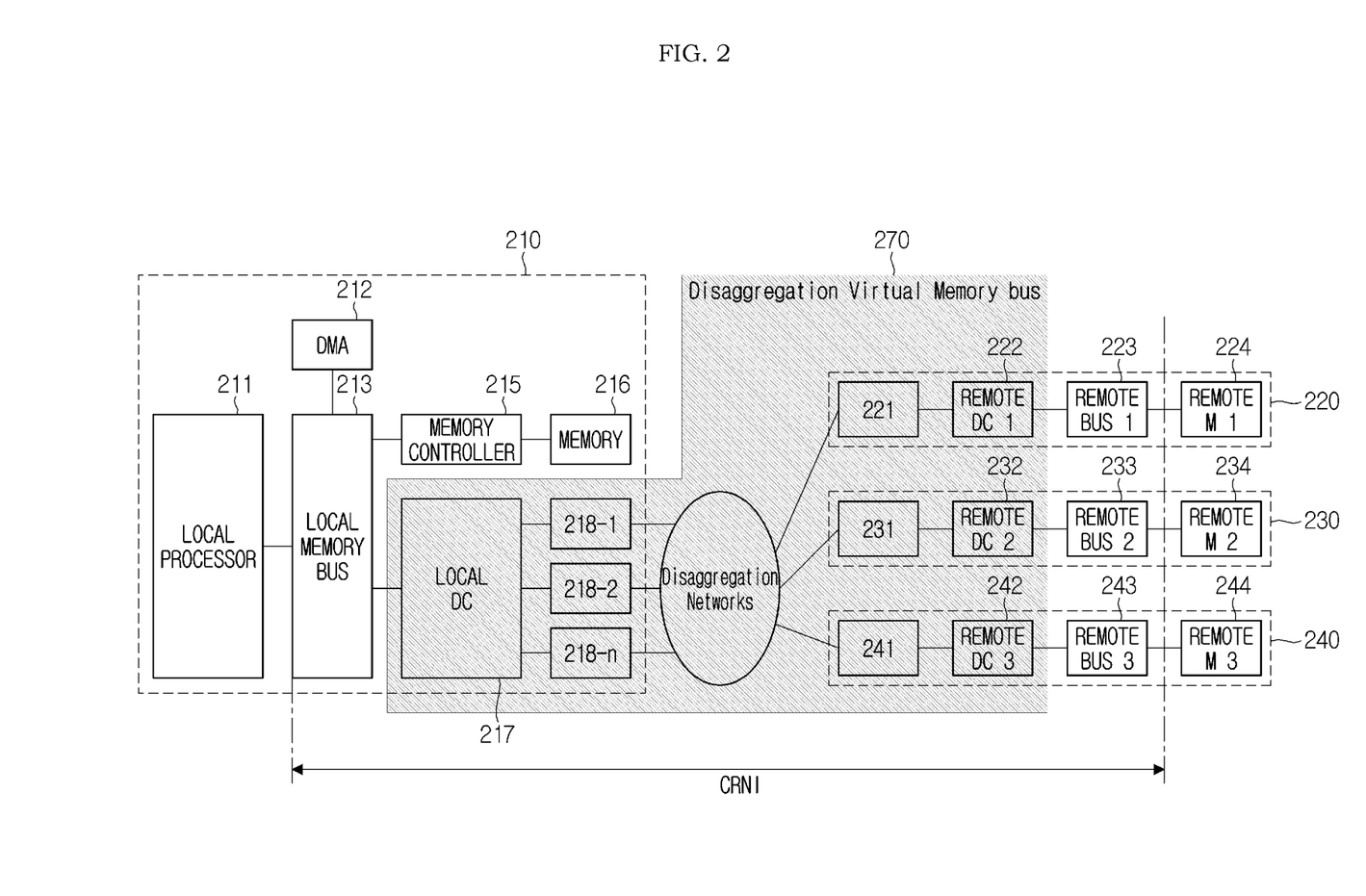
FIG. 2 is a block diagram illustrating a configuration of a disaggregation computing system according to an embodiment of the present disclosure.
Figure 3:
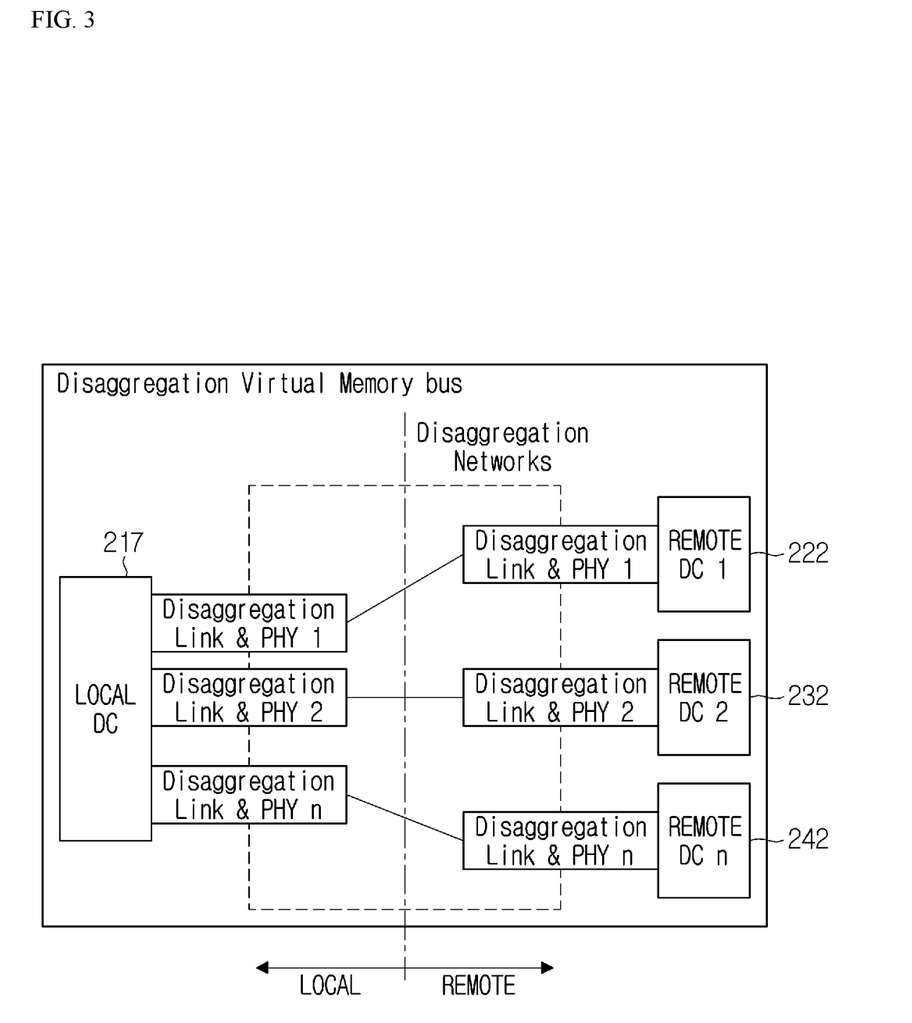
FIG. 3 is a block diagram illustrating a configuration of a disaggregation virtual memory bus in a disaggregation computing system according to an embodiment of the present disclosure.

FIG. 2 is a block diagram illustrating a configuration of a disaggregation computing system according to an embodiment of the present disclosure, and FIG. 3 is a block diagram illustrating a configuration of a disaggregation virtual memory bus in a disaggregation computing system according to an embodiment of the present disclosure.

First, referring to FIG. 2, a disaggregation computing system according to an embodiment of the present disclosure may include a local computing device 210 and remote computing devices 220, 230 and 240.

The local computing device 210 may include a local processor 211, a DMA 212, a local memory bus 213, a memory controller 215, a memory 216, a local disaggregation controller (hereinafter referred to as 'DC') 217, and disaggregation network interfaces 218-1, 218-2, 218-n.

At least one or more remote computing devices 220, 230 and 240 may be connected to the local computing device 210. The at least one or more remote computing devices 220, 230 and 240 may include at least one of a computing device, which includes a GPU, an accelerator or at least one processor, and a storage medium including a plurality of memories. The at least one or more remote computing devices 220, 230 and 240 according to an embodiment of the present disclosure may be of various types but may commonly include disaggregation network interfaces 221, 231 and 241, remote disaggregation controllers (hereinafter referred to as 'DC') 222, 232 and 242, and remote buses 223, 233 and 243. In addition, the at least one or more remote computing devices 220, 230 and 240 may include remote memories 224, 234 and 244 that are suitable for each type.

A memory disaggregation technology is needed to perform cooperative calculation as if the local computing device 210 and the at least one or more remote computing devices 220, 230 and 240, which exist in a remote site, or processors provided in the devices were configured in a single chip. For this, the local DC 217 of the local computing device 210 and the remote DCs 222, 232 and 242 of the remote computing devices 220, 230 and 240 provide a function of operating a processing unit of a same type, a processing unit of a different type, or a processor and a disaggregated cache, and a memory as if they were connected to a single memory bus. For this, a constitutional unit 270 between the local DC 217 of the local computing device 210 and the remote DCs 222, 232 and 242 of the remote computing devices 220, 230 and 240 may be provided as a disaggregation virtual bus or a disaggregation virtual memory bus. The disaggregation virtual memory bus 270 may be mediated by a network for disaggregation between the local DC 217 and the remote DCs 222, 232 and 242, may be transparently accessible by operating a protocol or a frame based on a byte address and may have a bus interface that is directly connected to each processing unit, each memory or each memory controller.

In an embodiment of the present disclosure, the bus interfaces 213, 223, 233 and 243 are a bus interface that is a criterion for generating and ending request and response signals of a disaggregation network, which may be referred to as a computing resource network interface (CRNI). The CNRN may be a management point at both ends of a conceptual scalable bus that connects protocol signals of a bus master and a bus slave in which a read and write request and a response of bus are generated and ended.

A disaggregation virtual bus or a disaggregation virtual memory bus, which exists within a CRNI section, is embodied by a disaggregation controller and should basically operate in connection with request and response operations for reading and writing address-based data of a memory bus, and a requester and a responder serving this function may be provided in the local DC 217 and the remote DCs 222, 233 and 242 respectively.

The requester is based on an address and data of an address-based (byte-addressable) memory bus 213 and a control signal related to reading and writing and thus may convert control information associated with address, data, reading, writing and request to a request protocol signal or frame suitable for a disaggregation network and forward the request protocol signal or frame to a requester of a remote computing device.

Figure 4:
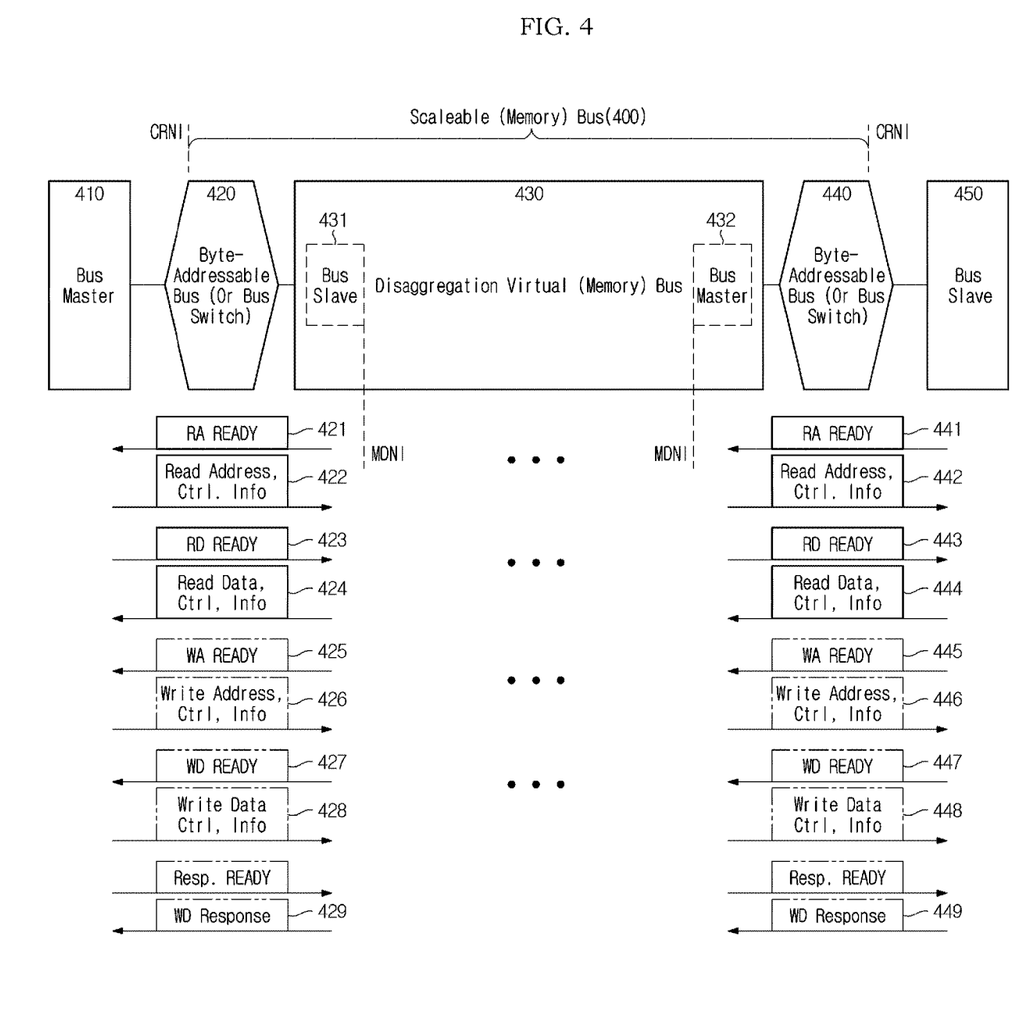
FIG. 4 is a block diagram illustrating a configuration of a computing resource network interface (CRNI) in a disaggregation computing system according to an embodiment of the present disclosure.

There is a management point in a section of a disaggregation virtual bus or a disaggregation virtual memory bus 400 in which each requester and each responder perform transmitting and receiving operations as a bus protocol at a network interface management point is converted to an adequate request response protocol signal or frame, and in an embodiment of the present disclosure, a memory disaggregation network interface (MDNI) may be designated and managed in a disaggregation network.

A responder of a remote computing device converts a request protocol signal or frame of a disaggregation network forwarded from a requester of a local computing device into an address, data, and a control signal of a byte-addressable memory bus, performs data reading and writing into a memory via a memory controller of a remote computing device with a responder through a memory bus, converts data and control information into a response protocol signal or frame of a disaggregation network, and then responds to the requester.

FIG. 4 is a block diagram illustrating a configuration of a computing resource network interface (CRNI) in a disaggregation computing system according to an embodiment of the present disclosure.

In a computing system that may comprise a multiple number of heterogeneous chips, each computing resource chip like CPU, GPU and a memory may be physically separated or be present in a remote site, but a computing device may be operated as if a cache of a computing resource and a memory, which are physically separated or distributed over remote sites, were connected directly by a bus. Accordingly, conceptually, they need to be controlled and managed as if being configured and attached to a single chip. In consideration of the above description, in FIG. 4, a functional conceptual diagram of a basic bus protocol is exemplified in a computing resource network interface (CRNI).

In the computing resource network interface (CRNI) of FIG. 4, a local memory bus 420 corresponds to the above-described local memory bus 213 of FIG. 2, a remote memory bus 440 corresponds to the above-described remote memory buses 223, 233 and 243 of FIG. 2.

As an example, when a structure of the disaggregation virtual memory bus 430 is not provided and a structure used for a conventional network connection is provided, the local memory bus 420 and the remote memory buses 223, 233 and 243 are operated independently of each other, so that an existing network protocol, which is not a bus protocol, is used, and another management program utilizing not a memory access but a DMA controller is required in an OS. On the other hand, in an embodiment of the present disclosure, as a function present in a processing unit like CPU and GPU or in a bus interface of a processor and a controller, a bus master 410 connected to the disaggregation virtual memory bus 430 executes a request, forwards a read and write request and command of a register, a cache and a memory, which are connected to a bus slave 450, to an address, data and control signal bus according to a bus protocol, and waits for a response.

The bus slave 450 may be connected to a memory controller, which provides a function of connecting mainly to a register, a cache and a memory, or may be connected directly to a register, a cache, and a memory. Accordingly, the bus slave 450 may provide a response to a request of the bus master 410. As an example, in the case of a data write request associated with an address, data and a control signal forwarded to a bus, the bus slave 450 may write data on a corresponding address of memory, register and cache and provide a write complete status to the bus master 410. As another example, for a read request, the bus slave 450 may read data in a corresponding address of memory, register and cache and forward data to the bus master 410 together with a read status and a response signal.

Hereinafter, in an embodiment of the present disclosure, like a processing unit such as CPU and GPU, a processor and a controller, when a device has a main typical function of computing processing like data processing and calculation and comprises a single chip that makes a request for reading and writing data of a memory during data calculation and receives a response to it, the device may be referred to as a processing unit. In addition, like a register, a cache and a memory, a memory and storage device capable of reading and writing random data in byte units may be referred to as a memory.

In case a memory or a memory controller is present in a processing unit and is connected to an internal memory or an attached memory to share data of memory with another processing unit, the bus slave 450 may also exist in the processing unit, allow the another processing unit to access a memory connected to it and make a response.

A communication between the bus master 410 and the bus slave 450 should have high reliability as it is a communication between a processing unit and a memory. Between a local CRNI and a remote CRNI, a requested address, data and control information should be transparently forwarded and exchanged. In addition, it is desirable that not only each bus protocol channel but also read and write channels are independently operated to provide a sufficient bandwidth and minimize delay and change of response time.

In this regard, bus protocols used for communication in a bus are distinguished mainly into read and write channels and are operated by interworking with a clock (CLK). Respective read and write channels may be distinguished into an address channel and a data channel respectively. Each address channel may consist of an address signal, which may distinguish an offset address into steps, relevant information and a signal of control information (IDs, length, size, type, cache, protection, service rating (QoS), VALID, etc), and each data channel may consist of a data signal, data information and a control signal (IDs, each byte valid, last data, VALID, etc).

Every byte address-based bus (the byte-addressable buses 420 and 440, the scalable bus 400, and the disaggregation bus 430) that is connected to a processing unit should have reliability of communication, and response information or a response signal should have high reliability so that it is possible to check whether or not data read and write are normally performed at a requested address.

A response signal for read may be included in a read data channel, along with a read data signal that is forwarded from a slave to a master. A write response signal may be configured as a separate write response channel consisting of a response signal that a slave performing a writing operation on a memory to a master, since a data signal is forwarded from a master to a slave, or may be configured as separate response signals 429 and 449 that a slave forwards to a mater at a data channel.

As each channel has bus ready signals 421, 423, 425, 427, 441, 443, 445 and 447, a master receiver or a slave receiver may forward each bus ready signal, which notifies that reception is ready, to a transmitter of a channel, thereby enabling the transmitter to read and write.

The bus 420 connected to the bus master 410 and the bus 440 connected to the bus slave 450 may have different bus speeds, bus scales and bandwidths, which are dependent on an internal clock respectively, and in the scalable memory bus 400, such different speeds and structures may be set adaptively to the speeds and structures of the bus slave 431 and the bus master 432 at the inlet and outlet of the disaggregation virtual bus 430.

A disaggregation virtual bus may configure and process read and write requests of every type of memories connected to every type of processing units remotely located suitably for a disaggregation protocol and a frame. As an example, a disaggregation virtual bus may forward mainly an address, data and a control signal and process corresponding read and write responses.

In an embodiment of the present disclosure, the structure of the scalable memory bus 400, which is applied by applying the disaggregation virtual bus 430 and an MDNI management point, may be operated in a scheme that never depends on a direct memory access (DMA) controller for remote access from the perspective of every processing unit, in which an OS is operated, but directly accesses a memory through the scalable bus 400.

Figure 5:
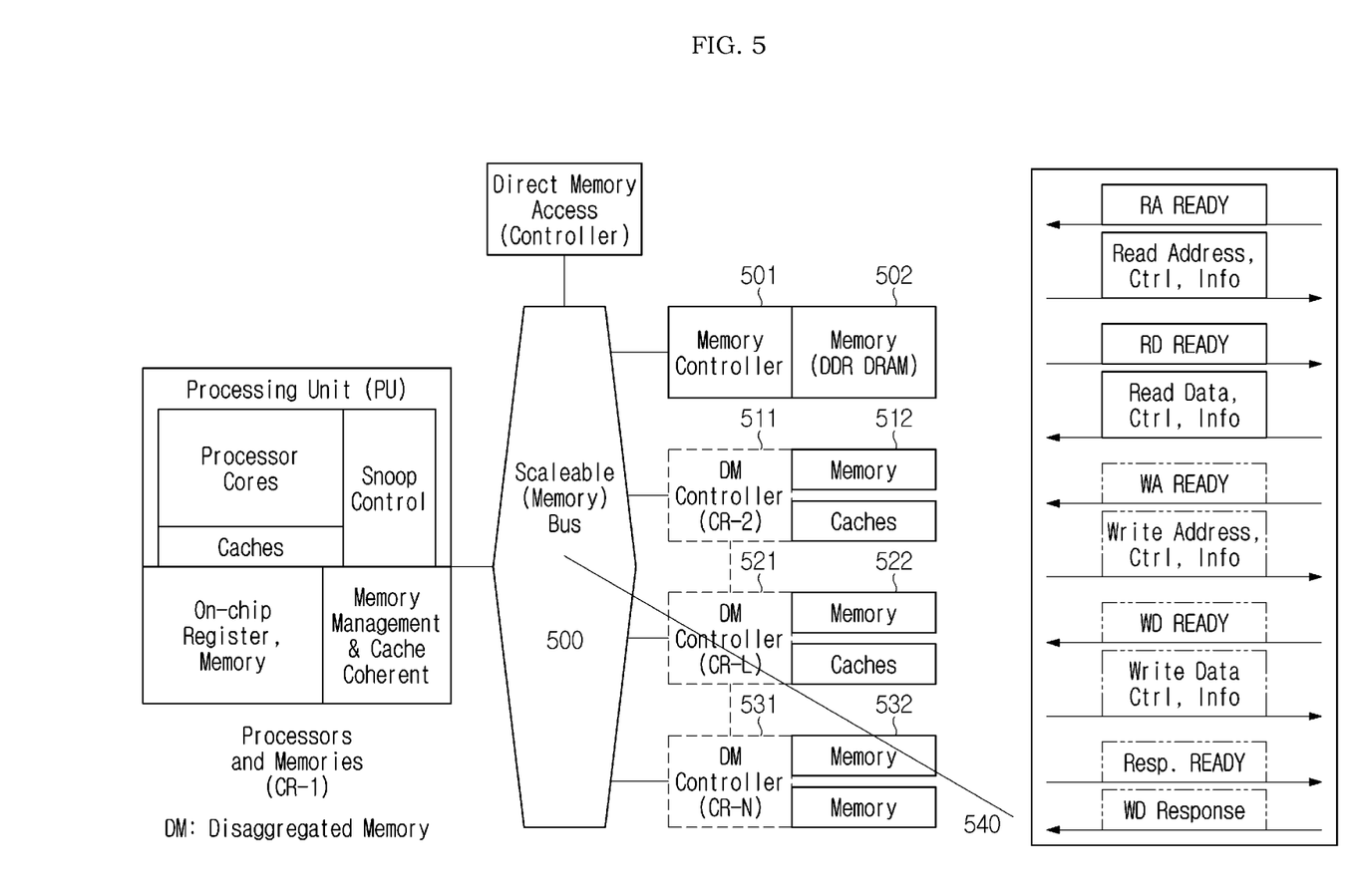
FIG. 5 is a view illustrating a logical memory access structure used in a disaggregation computing system according to an embodiment of the present disclosure.

As an example, as for memory access of a computing resource provided in a remote computing device, in case a CPU of a first remote computing device is capable of access every memory of each computing resource, a memory management unit and a processing unit of an operating system (OS) in a first remote computing device may be managed by a logical memory access structure, as shown in FIG. 5. In addition, like accessing a local memory 502 via a local memory controller 501, disaggregated memories 512, 522 and 532, which are remote memories, are accessible via disaggregation memory controllers 511, 521 and 531.

In an embodiment of the present disclosure, as for memories that are not disposed on a chip or a board due to disaggregation, every type of memories accessible from a remote site connected by a cable, which delivers an electric signal or an optical signal, is referred to as disaggregated memories.

FIG. 5 illustrates a concept of a basic bus protocol, from a functional perspective, which is necessary for a remote computing device to be controlled and managed as if it conceptually comprises a single chip.

The scalable bus 400 of FIG. 4 may be described as a single logical bus, which may be exemplified like the scalable bus 500 of FIG. 5. In FIG. 5, a processing unit may allocate an address (e.g. byte address) for access of a local memory and a disaggregated memory based on a bus protocol 540. As an example, a processing unit may allocate an address (e.g., byte address) for access of a local memory and a disaggregated memory as peripheral memories in a first computing device are conceptually configured by being connected to a single chip through different offset. Based on this, a processing unit using a disaggregated memory may read and write by directly accessing every disaggregated memory. A processing unit may control and manage all the memories but needs to consider a response speed.

A read and write response speed at a cache and other various memories is a very important factor for determining the operation performance of a processing unit or a processor.

In case an operating system (OS) operating a memory connected to a CPU of a first remote computing device and a memory management unit use only an existing physical local memory 502, there may be many processes implemented in a processing unit and a memory capacity required by each process may demand a larger amount of memory than a physical memory capacity. In this case, even when the virtual memory technology is used and a mapping table for mapping a virtual memory and an actual physical memory address is operated, the problem may be that competition between processes is unavoidable and further mapping table processing is performed to fairly distribute memories, which may cause another load.

In an embodiment of the present disclosure, when a disaggregated memory connected to a scalable memory bus is used, the capacity of a physical memory itself, which is available to an actual process in a processing unit like CPU and GPU, may be increased. Accordingly, it is possible to significantly reduce the amount of physical memories that are duplicated or compete in a mapping table between a virtual memory and an actual physical memory. Consequently, such a configuration and operation may reduce a fair allocation load and enhance an overall computing capability of utilizing computing resources together.

Figure 6:
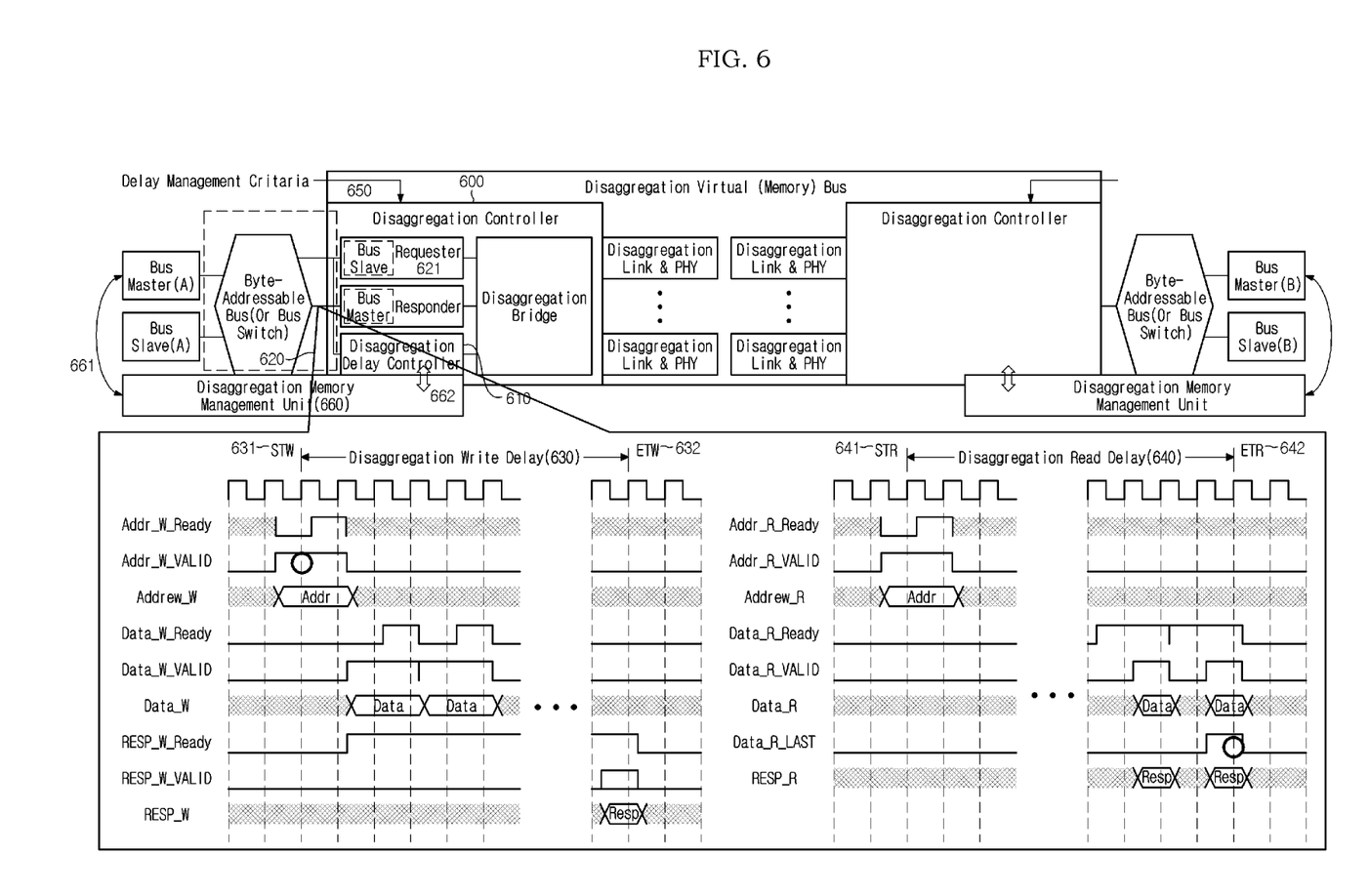
FIG. 6 is a view illustrating a managing operation of a disaggregation controller in a disaggregation computing system according to an embodiment of the present disclosure.

Furthermore, a processing unit needs to maintain performance through a memory management unit of a local memory with an existing fixed response speed and another disaggregated memory management unit 660. Accordingly, a response speed for read and write completion of a disaggregated memory at a bus protocol signal applied to the disaggregation controllers 511, 521 and 531 is a very important factor, and management of a response delay for each disaggregated memory is necessary.

In addition, disaggregated memories illustrated in FIG. 2 and FIG. 5 may be recognized as memory resources by being initially designated as disaggregated memories at a time where a processing unit and an OS are driven, like local memories, and on a management plane hosting the allocation and use of an OS or an allocated computing resource even when the processing unit and the OS are being operated, it is determined that an additional memory resource is necessary, so that a disaggregated memory connected to a disaggregation network may be added as a memory resource of the processing unit. However, in order to determine whether or not a designated or added disaggregated memory is capable of responding to a request within a sufficiently short time and to determine whether or not direct access is possible, response delay management is needed for the disaggregated memory.

Response delay information is managed and recorded based on an address at each disaggregated memory apart from a local memory in a mapping table of a virtual memory and a physical memory, which are distinguished based on an address, and a disaggregated memory management unit 660 for controlling memory access is required. A disaggregated memory management unit may manage a response delay status for each disaggregated memory and determine, based on a response delay status, whether many processes of each processing unit are to directly access a disaggregated memory or data exchange between a local memory and a disaggregated memory is to be performed using a DMA controller.

FIG. 6 is a view illustrating a managing operation of a disaggregation controller in a disaggregation computing system according to an embodiment of the present disclosure.

Referring to FIG. 6, a disaggregation controller 600 may set a user information-bearing signal such as a computing resource ID for a resource (CR-2~CR-N) of a remote computing device, an address ID, an offset value of an address, an address mask or a delay management criterion. A user information-bearing signal and the like may be set through a user information delivery interface 650.

In order to manage a disaggregated memory ID at a bus signal, which is input at a bus master, and to operate a relevant table 700 (refer to FIG. 7A) of the disaggregated memory management unit 660, delay information 662 of a disaggregation delay controller may be provided. Based on an existing virtual memory technology, the disaggregated memory management unit 660 may add disaggregated memory management information to a mapping table and operate and manage the information by mapping it with a physical memory address to which a disaggregated memory ID is applied.

Based on what is described above, the disaggregation controller 600 corresponding to a processing unit or processor equipped with a bus master A may include a requester, and for accessing a specific remote disaggregated memory, this requester may distinguish a disaggregated memory ID and an address by applying a part of a physical memory address to a bus signal.

Being connected to a responder of the disaggregation controller 600, a bus signal of a bus slave B may be delivered from each remote site via an MDNI, or by using a set disaggregated memory ID and address, a physical memory address used in a bus of the remote site may be identified (distinguished or derived). Accordingly, the disaggregation controller 600 may identify its bus memory address and process data at a corresponding physical memory address by applying a read and write protocol.

The timing diagram exemplified in FIG. 6 illustrates a delay management operation in which the disaggregation delay controller 610 according to an embodiment of the present disclosure performs a delay management function by monitoring a bus signal and recording a time stamp.

The timing diagram is illustrated in such a form that a bus master and a bus slave exist together in a processing unit at each end and thus memories are accessible to each other, and a response delay controller is additionally illustrated in the disaggregation virtual memory bus 430 as a detailed functional block of the disaggregation controllers 217, 222, 232 and 242 of FIG. 2.

That is, the response delay controller 610 is the disaggregation delay controller 610 that separates and monitors necessary write or read signals among bus signals 540 and 620 applied from a resource of a remote computing device existing in a remote site to the scalable bus 500 or the disaggregation virtual bus 300, and the disaggregation delay controller 610 is present in each of the disaggregation controllers 217, 222, 232 and 242 including a disaggregation requester and a disaggregation responder that process corresponding bus signals to be monitored according to a bus protocol.

The disaggregation controller may convert a request signal of a bus master into a request suitable for a disaggregation network according to a bus protocol, transmit the request and a bus signal, receive a response protocol signal or frame, convert an adequate response into a bus response signal 620 and deliver the signal to a bus master. Herein, the disaggregation controller may measure a delay and record and manage it through the response delay controller 610.

In FIG. 6, when the bus master A executes a write or read request, a write or read signal is delivered to a bus slave in the requester 621 of the disaggregation controller 600. At the same time, the disaggregation delay controller 610 may separate and monitor necessary write or read signals.

Figure 7A:
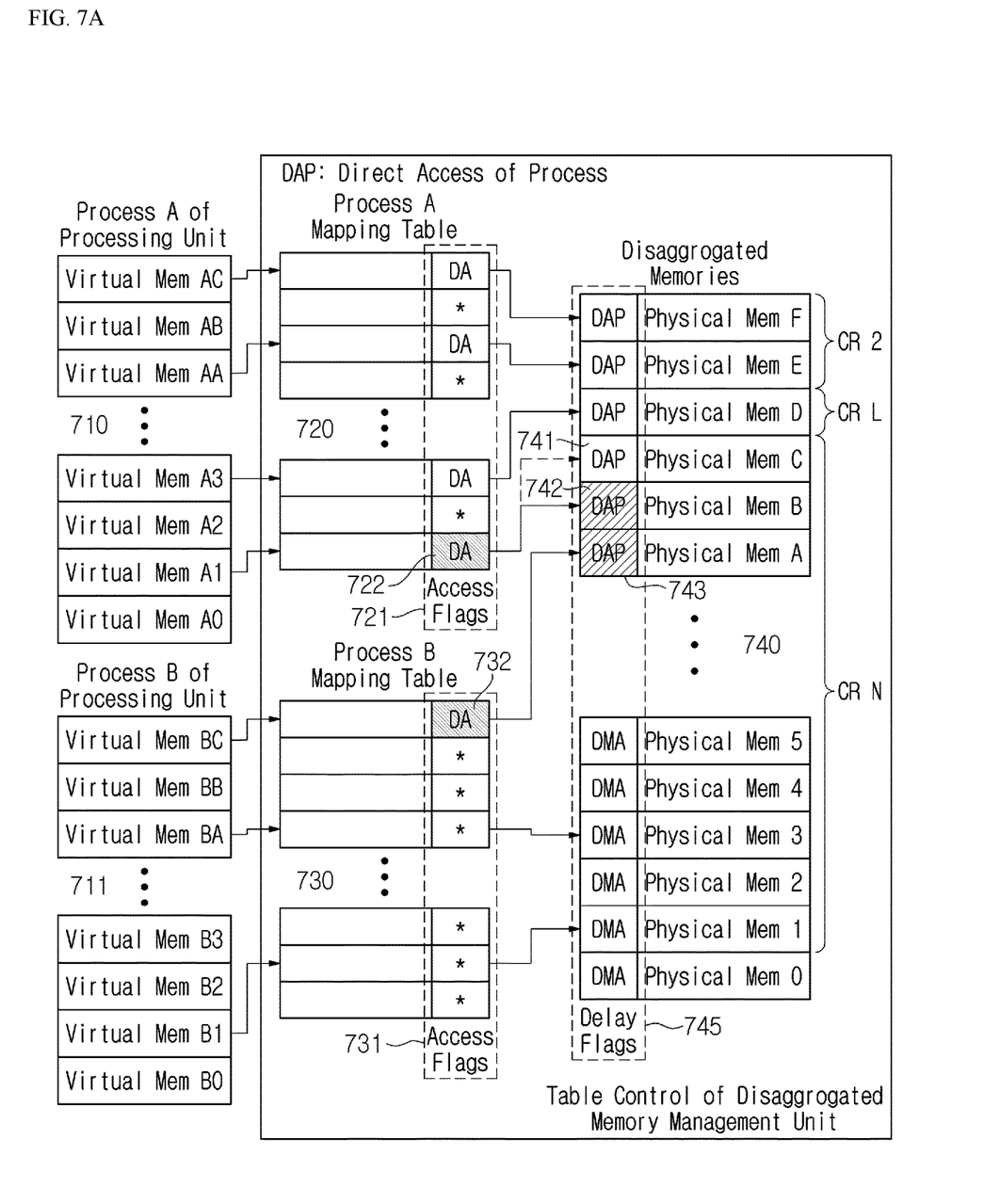
FIG. 7A and FIG. 7B are views illustrating a delay management operation using a mapping table in a disaggregation computing system according to an embodiment of the present disclosure.
Figure 7B:
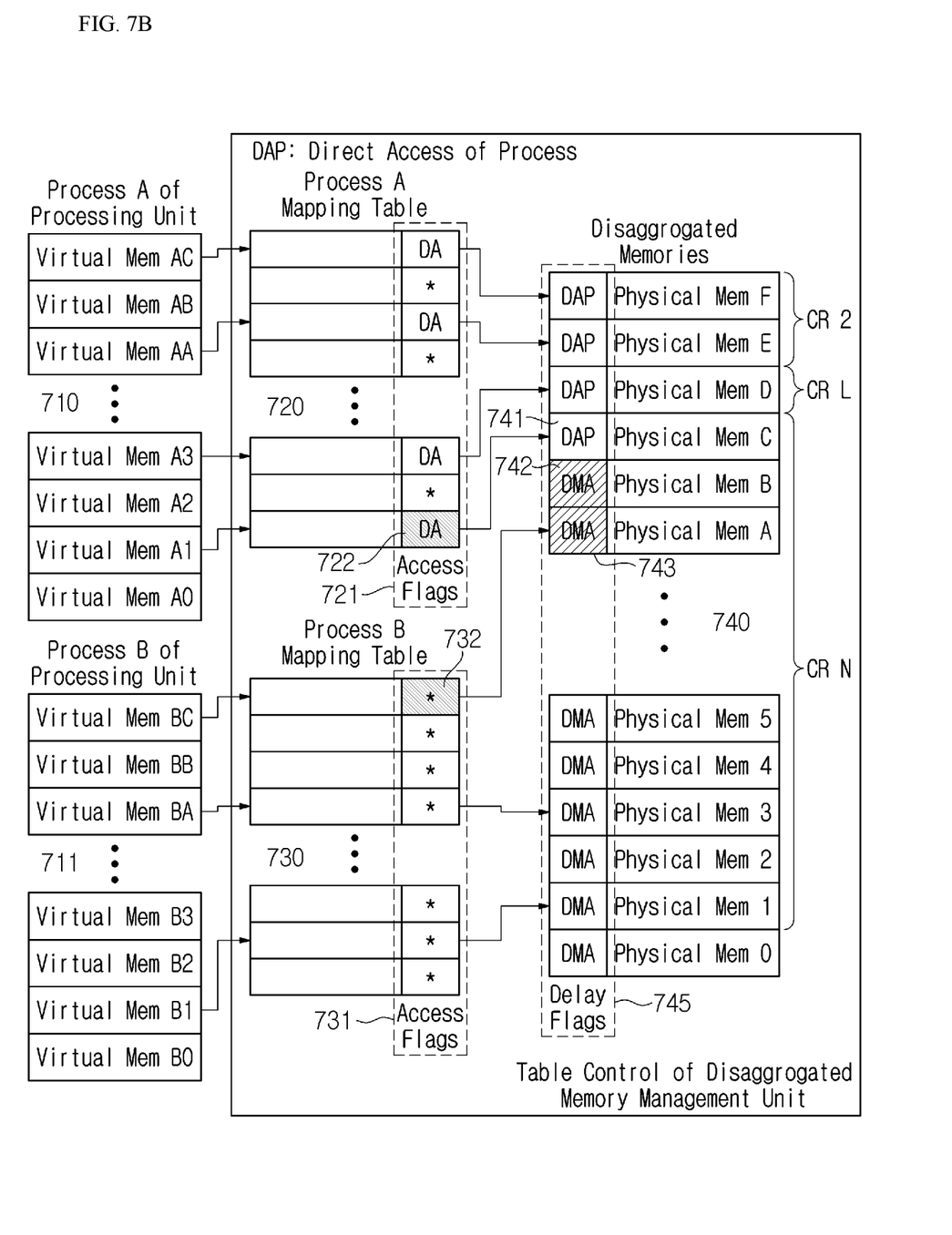

FIG. 7A and FIG. 7B are views illustrating a delay management operation using a mapping table in a disaggregation computing system according to an embodiment of the present disclosure.

The application of a disaggregated memory according to an embodiment of the present disclosure is a technology for further increasing a physical memory capacity available to each process of a processing unit and for sharing data between memories attached to each processing unit. According to an embodiment of the present disclosure, in case a processing unit or a processor utilizes a disaggregated memory that physically exists in a remote site, based on virtual memory address tables 710 and 711 for each process of a processing unit, like in FIG. 7A and FIG. 7B, the disaggregated memory management unit 660 may map a physical disaggregated memory address 740 to each of the mapping tables 720 and 730. In addition, based on the mapping tables 720 and 730, a process of each processing unit may use a disaggregated memory. However, as illustrated in FIG. 2, since a disaggregated memory is basically connected via a disaggregation network, a response delay may occur, which needs to be managed.

Accordingly, in an embodiment of the present disclosure, in measurement management of delay, a measured delay value such as a disaggregation write delay value or a disaggregation read delay value may be compared with read or write delay management criteria 650, and a disaggregation delay controller may share (662) delay comparison information with a disaggregated memory management unit, record a delay flag 745 in each disaggregated memory address table, which is distinguished and managed by a specific disaggregated memory ID, and manage the delay flag 745.

A disaggregation delay controller may compare a measured delay value with a management criterion, and in case the measured delay value is smaller than the management criterion, the disaggregation delay controller may record a direct access of process (DAP) delay flag, when DAP is possible. Meanwhile, in case the measured delay value is not smaller than the management criterion, the disaggregation delay controller may record a DMA delay flag, when each process writes and reads memory data on a disaggregated memory by utilizing a DMA controller.

When using a disaggregated memory, a process of each processing unit may know a physical disaggregated memory address through a disaggregated memory mapping table that is managed by a disaggregated memory management unit.

The disaggregated memory mapping tables 720 and 730 according to an embodiment of the present disclosure may have access flags 721 and 731 that notify whether or not direct access is possible like memories in a same board. Herein, an access flag may be updated in dependence on a delay flag 745. As the status of an access flag is shared by a processing unit (or bus master) (661), a process of the processing unit may read or write directly on a disaggregated memory through a bus in a same board, as shown in FIG. 6, without using a DMA controller through direct access (DA) flags 722 and 732.

In case a DA flag is not enabled, a processing unit (or bus master) should be accessed using a DMA controller and may be operated by being recognized like a general peripheral device or block device or be used by considering delay through separate operating software.

Meanwhile, in FIG. 7A, in case a delay value of physical memories A and B of a disaggregated memory increases variably to be greater than or exceed a threshold of the read and write delay management criteria 650, the delay flags 742 and 743 may not maintain a DAP flag any longer. In this case, as shown in FIG. 7B, the delay flags 742 and 743 may change to a DMA flag, and there may be a change in the corresponding access flags 722 and 732 in a mapping table.

In FIG. 7B, when the delay flags 742 and 743 for the physical disaggregated memories A (Physical Mem A) and B (Physical Mem B) are all changed to DMA flags, the DA flag of the physical disaggregated memory A may be disabled and disappear like the access flag 732 of a mapping table of the process B of a processing unit. In this case, it may be confirmed that a process using a virtual memory address BC does not directly access and use the disaggregated memory (Physical Mem A) through a mapping table any more. Accordingly, a DMA controller is used to access the disaggregated memory (Physical Mem A).

Meanwhile, as necessary, when a physical disaggregated memory, which is directly accessible like the access flag 722 of a mapping table of the process A of a processing unit, is still needed, if the mapping table has a disaggregated memory that will replace or is capable of replacing the disaggregated memory B (Physical Mem B) with an increase in an existing response delay, the directly accessible flag 741 may be maintained. In this case, the mapping table may be updated or replaced by a non-mapped disaggregated memory C (Physical Mem C), and the performance of the process A of the processing unit may be maintained.

Figure 8:
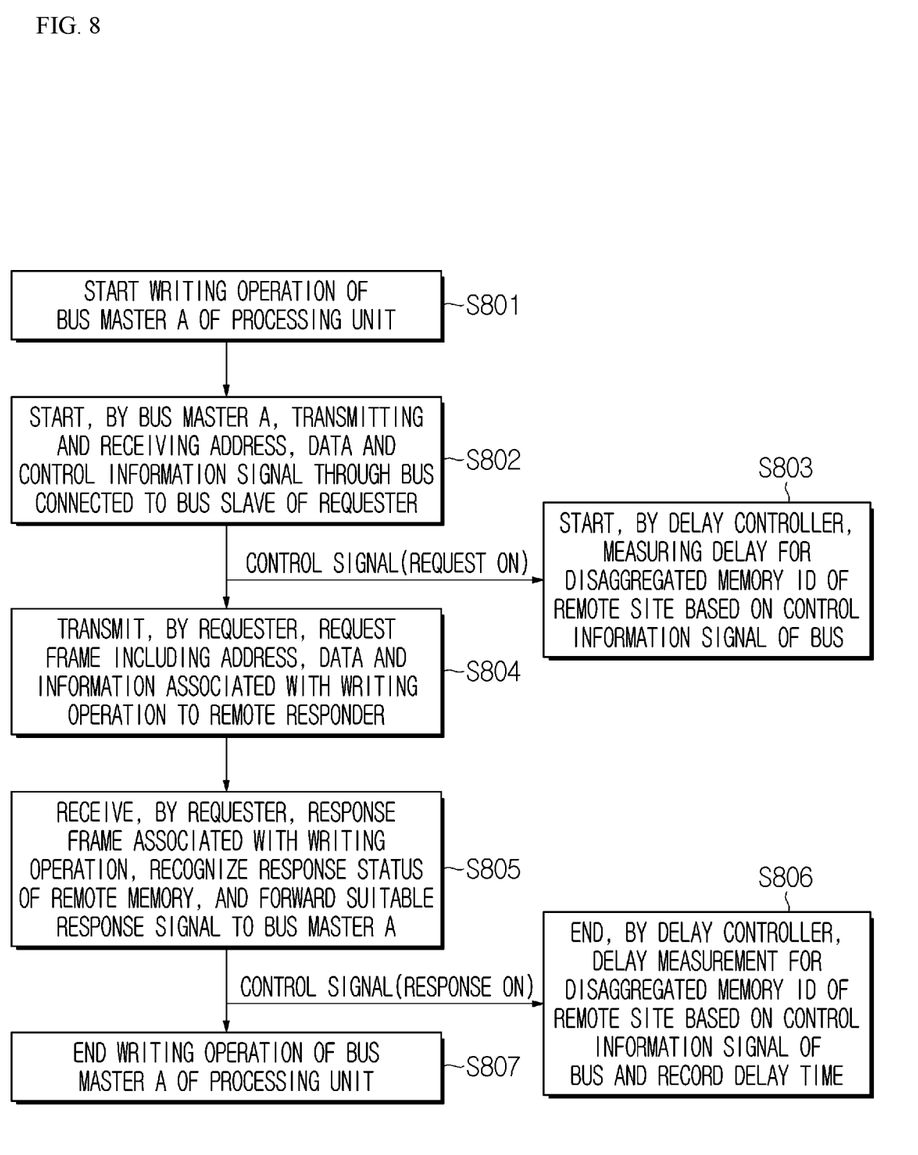
FIG. 8 is a flowchart illustrating an operation of managing write delay information of a remote memory of a disaggregation controller in a disaggregation computing system according to an embodiment of the present disclosure.

FIG. 8 is a flowchart illustrating an operation of managing write delay information of a remote memory of a disaggregation controller in a disaggregation computing system according to an embodiment of the present disclosure.

In FIG. 8, the disaggregation delay controller 610 according to an embodiment of the present disclosure exemplifies an operation of recording a delay time in a memory data writing process for an address corresponding to a specific remote disaggregated memory ID 740.

In a process in which a bus master A according to an embodiment of the present disclosure writes memory data of an address corresponding to the specific remote disaggregated memory ID 740, when a writing operation of the bus master A of a processing unit starts, the bus master A begins to transmit and receive an address, data and control information suitable for a bus protocol through a bus connected to a bus slave of a requester, and when a Addr_W_VALID signal for notifying the validity of a write address (Write Address Valid) is on or enabled, the disaggregation delay controller 610, which monitors a control information signal, begins to measure delay by recoding a stamp of start time of write (STW) 631 for a remote disaggregated memory ID or operating a counter (S801, S802, S803).

Next, the address, data and information signal are forwarded to a slave in the requester 621 through a bus, and the requester transmits it to a remote responder using a request frame or protocol including the address, data and control information signal associated with a writing operation via a disaggregation network (S804).

As the bus master of the remote responder is delivered to a remote memory slave B through a suitable bus protocol, write data may be completely written on a memory of a remote site, the requester 621 may recognize a response status of the memory in the remote site by means of a response frame or protocol that is transmitted by the remote responder, and based on the recognized response status, the requester may forward a response signal to the bus master A according to a bus protocol (S805).

When the RESP_W_VALID signal for notifying the validity of a response (Write Response Valid) is on or enabled, the disaggregation delay controller 610 ends delay measurement by recording a stamp of an end time of write (ETW) 632 or terminating a counter and records a time of disaggregation write delay 630 for the disaggregated memory ID of the remote site (S806). In this process, a writing operation of the bus master A of the processing unit ends (S807).

Figure 9:
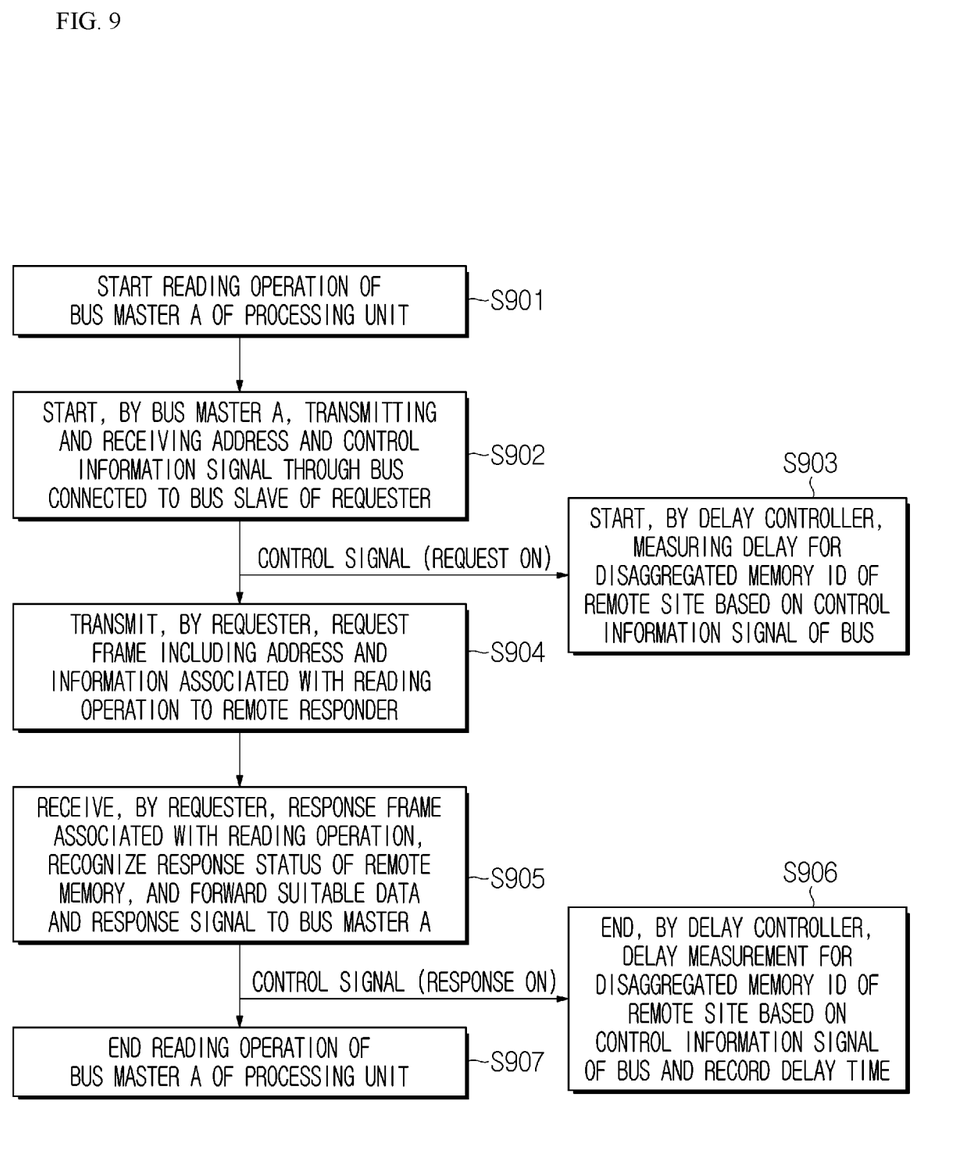
FIG. 9 is a flowchart illustrating an operation of managing read delay information of a remote memory of a disaggregation controller in a disaggregation computing system according to an embodiment of the present disclosure.

FIG. 9 is a flowchart illustrating an operation of managing read delay information of a remote memory of a disaggregation controller in a disaggregation computing system according to an embodiment of the present disclosure.

In FIG. 9, the disaggregation delay controller 610 according to an embodiment of the present disclosure exemplifies an operation of recording a delay time in a memory data reading process for an address corresponding to a specific remote disaggregated memory ID 740.

In a process in which a bus master A reads memory data of an address corresponding to the specific remote disaggregated memory ID 740, when a reading operation of the bus master A of a processing unit starts, the bus master A begins to transmit and receive an address and control information suitable for a bus protocol through a bus connected to a bus slave of a requester, and when a Addr_R_VALID signal for notifying the validity of a read address (Read Address Valid) is on or enabled, the disaggregation delay controller 610, which monitors a control information signal, begins to measure delay by recoding a stamp of start time of read (STR) 641 for a remote disaggregated memory ID or operating a counter (S901, S902, S903).

Next, the address, data and information signal are forwarded to a slave in the requester 621 through a bus, and the requester forwards it to a remote responder using a request frame or protocol including the address and control information signal associated with a reading operation via a disaggregation network (S904).

The bus master of the remote responder may complete reading data onto a memory of a remote site through a remote memory slave B according to a suitable bus protocol, the requester 621 may recognize a response status of the memory in the remote site by means of a response frame or protocol including read data that is transmitted by the remote responder, and based on the recognized response status, the requester may forward data and a corresponding response signal to the bus master A according to a bus protocol (S904, S905).

When a Data_R_LAST signal for notifying last read data is on or enabled, the disaggregation delay controller 610 ends delay measurement by recording a stamp of an end time of read (ETR) 642 or terminating a counter and records a time of disaggregation read delay 640 for the disaggregated memory ID of the remote site (S906). A measured delay value may be derived by calculating a difference of counter values or time stamp values using a clock. In this process, a reading operation of the bus master A of the processing unit ends (S907).

In an embodiment of the present disclosure, a processor may be a semi-conductor device executing the processing of commands stored in a central processing unit (CPU) or a memory and/or storage. The memory and the storage may include various types of volatile or non-volatile storage media. For example, the memory may include a read only memory (ROM) and a random access memory (RAM).

Accordingly, steps of a method or an algorithm described in relation to embodiments of the present disclosure may be directly implemented by hardware, which is executed by a processor, a software module, or a combination of these two. A software module may reside in a storage medium (that is, a memory and/or a storage) like RAM, flash memory, ROM, EPROM, EEPROM, register, hard disk, removable disk, and CD-ROM. An exemplary storage medium is coupled with a processor, and the processor may read information from a storage medium and may write information into a storage medium. In another method, a storage medium may be integrated with a processor. A processor and a storage medium may reside in an application-specific integrated circuit (ASIC). An ASIC may reside in a user terminal. In another method, a processor and a storage medium may reside in a user terminal as individual components.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A disaggregation computing system, comprising:
a local computing device that comprises a local processor, a local memory bus, a local memory and a local disaggregation controller;
a remote computing device that comprises a remote processor, a remote memory bus, a remote memory and a remote disaggregation controller; and
a disaggregation network that connects the local computing device and the remote computing device,
wherein at least one of the local disaggregation controller and the remote disaggregation controller is configured to:
check a response delay for access of the remote memory, and
control the access of the remote memory based on the response delay.

2. The disaggregation computing system of claim 1, further comprising a disaggregation virtual bus or a disaggregation virtual memory bus, which includes the local disaggregation controller, the remote disaggregation controller and the disaggregation network.

3. The disaggregation computing system of claim 2, wherein the disaggregation virtual bus or the disaggregation virtual memory bus comprises:
   a bus master, configured as a processing unit or a processor, and configured to transmit a request; and
   a bus slave configured to deliver a response for a read request or a write request of a memory to the local memory bus or the remote memory bus.

4. The disaggregation computing system of claim 2, wherein the local disaggregation controller and the remote disaggregation controller comprise:
   a request configured to process a request for a data reading operation or a writing operation; and
   a responder configured to process a response to the data reading operation or the writing operation.

5. The disaggregation computing system of claim 3, wherein a channel used for communication between the bus master and the bus slave includes a read channel and a write channel,
   wherein the read channel and the write channel include an address channel and a data channel respectively,
   wherein the address channel includes an address signal for identifying the remote memory by a disaggregated memory ID or for identifying an offset address and address control information, and
   wherein the data channel includes a data signal and data control information.

6. The disaggregation computing system of claim 2, wherein the local disaggregation controller and the remote disaggregation controller comprise a disaggregated memory management unit that manages at least one of the remote memory based on an address and controls memory access.

7. The disaggregation computing system of claim 6, wherein the disaggregated memory management unit is configured to:
   map a physical address and a virtual address of the remote memory, and
   generate and manage a mapping table that manages a disaggregated memory based on an address.

8. The disaggregation computing system of claim 7, wherein the disaggregated memory management unit is further configured to:
   manage read delay information or write delay information for a disaggregated memory unit, and
   manage a flag determining whether or not the disaggregated memory unit is directly accessible according to the read delay information or write delay information.

9. The disaggregation computing system of claim 7, wherein the local disaggregation controller and the remote disaggregation controller are configured to determine, based on read delay information or write delay information for a disaggregated memory unit, whether or not the disaggregated memory is directly accessible.

10. The disaggregation computing system of claim 2, wherein the local disaggregation controller and the remote disaggregation controller comprise a disaggregation delay controller configured to measure and record a delay for the at least one remote memory.

11. The disaggregation computing system of claim 10, wherein the disaggregation delay controller is further configured to:
    measure a read delay or a write delay for a disaggregated memory unit, and
    manage a measured delay value.

12. The disaggregation computing system of claim 10, wherein the disaggregation delay controller is further configured to:
    recognize a read or write request signal and a time for a disaggregated memory unit by monitoring control information of a bus protocol,
    measure a delay of the disaggregated memory unit by recognizing a response signal and a time for the disaggregated memory unit, and
    measure a measured delay value.

13. A disaggregation computing system, comprising:
    a local computing device that comprises a local processor, a local memory bus, a local memory and a local disaggregation controller;
    a remote computing device that comprises a remote processor, a remote memory bus, a remote memory and a remote disaggregation controller; and
    a disaggregation network that connects the local computing device and the remote computing device,
    wherein at least one of the local disaggregation controller and the remote disaggregation controller is configured to:
    check a response delay for access of the remote memory, and
    control the access of the remote memory based on the response delay, and
    wherein the local disaggregation controller and the remote disaggregation controller comprise a disaggregation delay controller configured to measure and record a delay for the at least one remote memory.

* * * * *